United States Patent
Zuzelski et al.

(10) Patent No.: US 10,259,490 B2
(45) Date of Patent: Apr. 16, 2019

(54) SYSTEMS AND METHODS FOR MONITORING RACK AND PINION STEERING GEAR OVERTRAVEL

(71) Applicant: GM GLOBAL TECHNOLOGY OPERATIONS LLC, Detroit, MI (US)

(72) Inventors: John T. Zuzelski, Clarkson, MI (US); David Juarez, Grosse Pointe Shores, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 164 days.

(21) Appl. No.: 15/622,579

(22) Filed: Jun. 14, 2017

(65) Prior Publication Data

US 2018/0362071 A1    Dec. 20, 2018

(51) Int. Cl.
 *B62D 5/04* (2006.01)
 *B62D 3/12* (2006.01)
 *B60R 16/023* (2006.01)

(52) U.S. Cl.
 CPC ........... *B62D 5/0481* (2013.01); *B62D 3/126* (2013.01); *B62D 5/04* (2013.01); *B60R 16/0231* (2013.01)

(58) Field of Classification Search
 CPC .... B60R 16/0231; B62D 3/126; B62D 5/0481
 See application file for complete search history.

(56) References Cited

U.S. PATENT DOCUMENTS

| | | | |
|---|---|---|---|
| 2013/0030653 A1* | 1/2013 | Soos | B62D 5/0424 701/41 |
| 2014/0288779 A1* | 9/2014 | Di Cairano | B62D 15/0235 701/42 |
| 2014/0336878 A1* | 11/2014 | Yanai | G01D 5/145 701/41 |
| 2015/0183453 A1* | 7/2015 | Kim | B62D 5/046 701/41 |
| 2017/0190355 A1* | 7/2017 | Ghoneim | B62D 5/0481 |
| 2018/0043931 A1* | 2/2018 | Gupta | B62D 5/0457 |
| 2018/0281845 A1* | 10/2018 | Wijffels | B62D 5/0484 |

* cited by examiner

*Primary Examiner* — Tony H Winner
(74) *Attorney, Agent, or Firm* — Lorenz & Kopf, LLP (57) ABSTRACT

Methods and systems are provided for monitoring steering gear overtravel in rack and pinion steering systems. The provided systems and methods introduce a change in the length of the fastener that attaches an inner tie rod ball joint housing within a steering gear rack bar. The provided systems and methods also monitor the disengagement of that fastener (also referred to as overtravel and as rack travel) to generate flags and provide them to the Controller Area Network (CAN) bus of the vehicle.

20 Claims, 7 Drawing Sheets

SYSTEMS AND METHODS FOR MONITORING RACK AND PINION STEERING GEAR OVERTRAVEL

TECHNICAL FIELD

The technical field generally relates to Electric Power Steering systems (EPS), and more particularly relates to systems and related operating methods for monitoring overtravel in the rack and pinion steering gear of an EPS.

BACKGROUND

Within an Electric Power Steering system (EPS), various mechanical components interact to apply turning forces on the turning wheels of a vehicle. In particular, the rack and pinion steering gear of an EPS includes one or more of an inner tie rod ball joint housing attached within a steering gear rack bar. The two are attached by a fastener extending from the inner tie rod ball joint housing. The fastener is, initially, completely secured within the steering gear rack bar via a threaded interface. Over the course of time, and responsive to vehicle operation and turning, the fastener may at least partially disengage from its secured position. The disengagement may be measured as overtravel. At some threshold of disengagement, the security of the attachment of the inner tie rod ball joint housing to the steering gear rack bar may be compromised.

Accordingly, systems and related operating methods for monitoring overtravel in the rack and pinion steering gear of an EPS are desirable. The desirable systems and methods provide, responsive to the monitoring, (i) a caution flag for use on the Controller Area Network (CAN) bus of the vehicle, and (ii) an urgent flag for use on the CAN bus. The caution flag and urgent flag may be generated responsive to comparing a detected amount of disengagement or overtravel to one or more configurable predetermined thresholds. Furthermore, other desirable features and characteristics of the present disclosure will be apparent from the subsequent detailed description and the appended claims, taken in conjunction with the accompanying drawings and the foregoing technical field and background.

SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

An electronic control unit (ECU) for a steering system in a vehicle is provided. The ECU comprising: a memory comprising a program; and a processor coupled to the memory and configured to: receive and store in the memory a first predefined value (PD1) and a second predefined value (PD2); receive and store in the memory a right learned rack travel (RLRT), and a true rack center offset (TRCO); receive and store in the memory a left learned rack travel (LLRT); process PD1, PD2, RLRT, and TRCO to generate a first rack travel right (RTR) threshold, a second RTR threshold, a first rack travel left (RTL) threshold and a second RTL threshold; receive rack travel data associated with an ECU sensor, the rack travel data comprising a rack travel right (RTR) and a rack travel left (RTL); and assert a first flag responsive to determining (i) that RTR is greater than the first RTR threshold, or (ii) that RTL is greater than the first RTL threshold.

Also provided is an electronic power steering system (EPS) for a vehicle. The EPS comprising: a memory comprising a program; and a processor coupled to the memory and configured to: receive and store in the memory a first predefined value (PD1) and a second predefined value (PD2); receive and store in the memory a right learned rack travel (RLRT), and a true rack center offset (TRCO); process PD1, PD2, RLRT, and TRCO to generate a first rack travel right (RTR) threshold and a second RTR threshold; receive rack travel data associated with an ECU sensor, the rack travel data comprising a rack travel right (RTR); and assert a first flag upon determining that RTR is greater than the first RTR threshold, or assert a second flag upon determining that RTR is less than or equal to the first RTR threshold, and greater than the second RTR threshold.

A method for operation of an electronic control unit (ECU) in a vehicle is provided. The method comprises: receiving and storing in a memory a first predefined value (PD1) and a second predefined value (PD2); receiving and storing in the memory a right learned rack travel (RLRT), and a true rack center offset (TRCO); generating a first rack travel right (RTR) threshold and a second RTR threshold based on PD1, PD2, RLRT, and TRCO; utilizing a fastener having a thread size to fastener length ratio of approximately 3:5 to couple an inner tie rod ball joint housing to a steering gear rack bar; generating rack travel data comprising a rack travel right (RTR) based on data from an ECU sensor; and asserting a first flag upon determining that RTR is greater than the first RTR threshold, or asserting a second flag upon determining that RTR is less than or equal to the first RTR threshold and greater than the second RTR threshold.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration." Any implementation described herein as exemplary is not necessarily to be construed as preferred or advantageous over any other implementations.

It should be appreciated that the various block components techniques and technologies described herein and with reference to symbolic representations of operations, processing tasks, and functions that may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Such operations, tasks, and functions are sometimes referred to as being computer-executed, computerized, software-implemented, or computer-implemented.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to transmitting and receiving signals, wireless communication modules, wireless transceivers, network interfaces, and other functional aspects of certain systems and subsystems (and the individual operating components thereof) may not be described in detail herein. In addition, certain terminology may also be used in the following description for the purpose of reference only. Accordingly, the examples presented herein are intended as non-limiting.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method for detecting faults in vehicle lateral velocity estimation may take the form of a control module integrated within a preexisting mobile platform management system or vehicle management system.

As an overview, the provided systems and methods enable a novel technological solution to the technological problem of undetected and unquantified steering gear overtravel. The provided systems and methods introduce a change in the length of the fastener that attaches an inner tie rod ball joint housing within a steering gear rack bar. The provided systems and methods also monitor the disengagement of that fastener (also referred to as overtravel and as rack travel) to generate flags suitable for the Controller Area Network (CAN) bus of the vehicle. The flags can be accessed and processed by other vehicle systems also on the CAN bus. In one example application, a caution flag may be processed to put the driver on notice of the status of the disengagement. In another example, an urgent flag may be processed by other vehicle systems in a variety of ways, such as to limit an amount of ignition cycles that remain, or even to completely stop vehicle operation. As used herein, the provided system for monitoring rack and pinion steering gear overtravel in a vehicle is included within an Electronic Control Unit module (ECU) that may or may not be integrated with the vehicle's Rack Electric Power Steering (REPS) gear. As also used herein, the method for monitoring rack and pinion steering gear overtravel in a vehicle is a novel new module integrated within the ECU of the vehicle.

Figure 1:
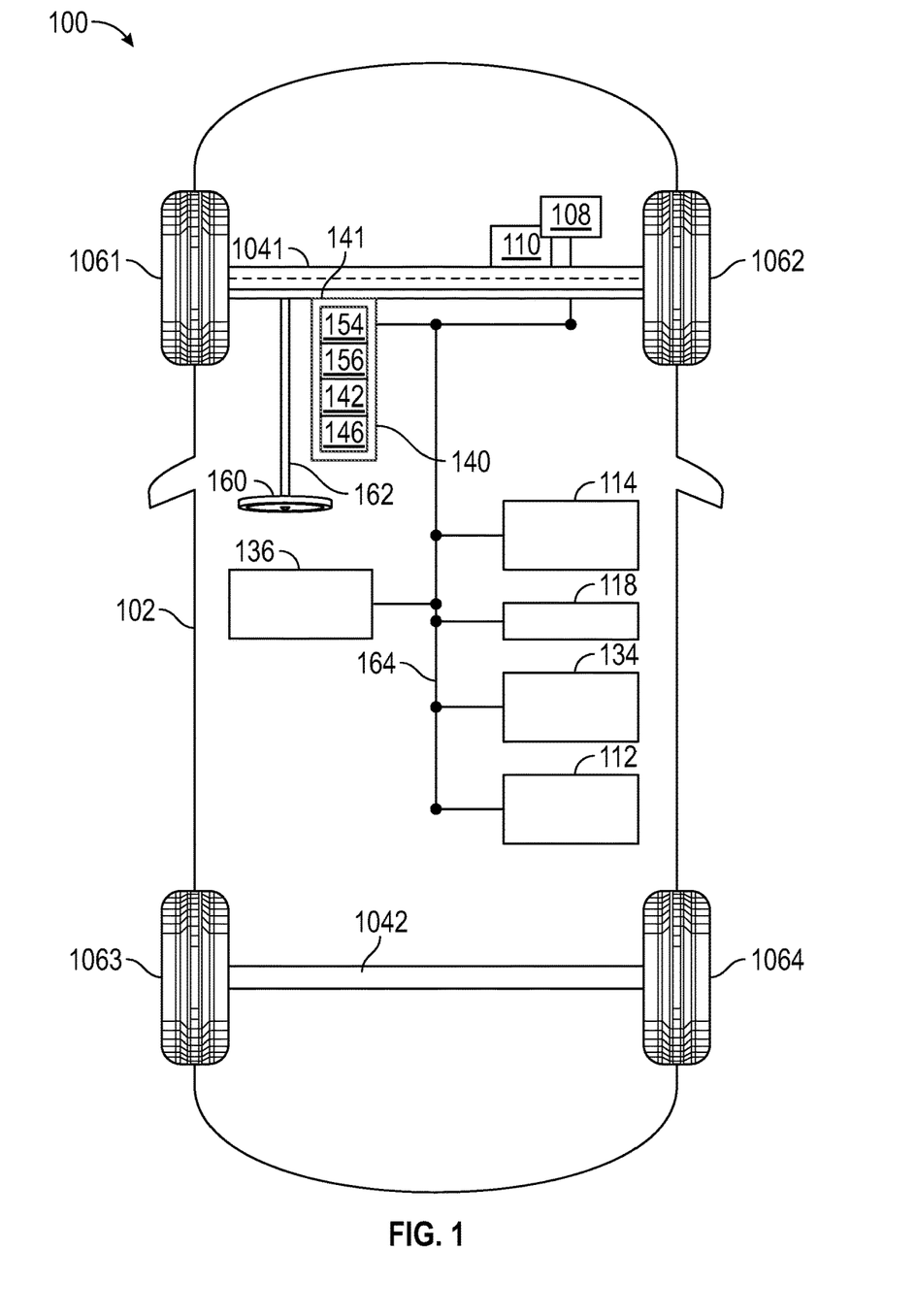
FIG. 1 is a functional block diagram illustrating an Electronic Control Unit module (ECU) in a vehicle, in accordance with various exemplary embodiments.

Turning now to FIG. 1, a functional block diagram of a vehicle 100 is depicted, in accordance with an exemplary embodiment. The vehicle 100 includes a body 102 that is arranged on chassis 1041 and chassis 1042. The body 102 substantially encloses the systems and components of the vehicle 100. The body 102, the chassis 1041, and the chassis 1042 may jointly form a frame. With regard to the present disclosure, the vehicle 100 includes a plurality of wheels 1061, 1062, 1063, 1064, a steering wheel 160, a steering rod 162, Rack Electric Power Steering gear (REPS) 141, and a steering gear Electronic Control Unit module (ECU) 140. In the embodiment depicted in FIG. 1, a program product (program 156) associated with the methods and systems introduced herein resides in memory in the ECU 140 of the vehicle 100; however, the program 156 may reside in other systems or locations. The wheels 1061 and 1062 are each rotationally coupled to the chassis 1041 and REPS 141 near a respective corner of the body 102 to facilitate movement and turning of the vehicle 100. The wheels 1063 and 1064 are coupled the chassis 1042.

Although, in the exemplary embodiment of FIG. 1, the front wheels 1061 and 1062 are the turning wheels that receive the turning forces and turn the vehicle 100, other embodiments may achieve steering by applying turning forces to the rear wheels 1063 and 1064. Further, the location of the turning wheels is not limited to only the front or the back of a mobile platform, and the concepts presented herein can be deployed in mobile platforms with varying numbers of wheels, such as aircraft, spacecraft, watercraft, off-road vehicles, motorcycles, robots, robotic devices, and the like. The functions of each of the components and/or functional blocks are described in detail below.

As is readily appreciated, steering initiates turning, and the REPS 141, in cooperation with the ECU 140, comprises the components and sub-systems to collectively operate as what a user experiences as electric power steering for the vehicle 100. Therefore, in various embodiments, the REPS 141 comprises the ECU 140. In various embodiments, the REPS 141 may also comprise: a sensor system 134, including ECU sensors 504 (FIG. 5); and, mechanical components that are utilized to apply the turning forces on the wheels. In addition, at least some of the mechanical components of the REPS 141 may be referred to as the "rack," which is described in more detail in connection with FIGS. 2 and 6.

Figure 2:
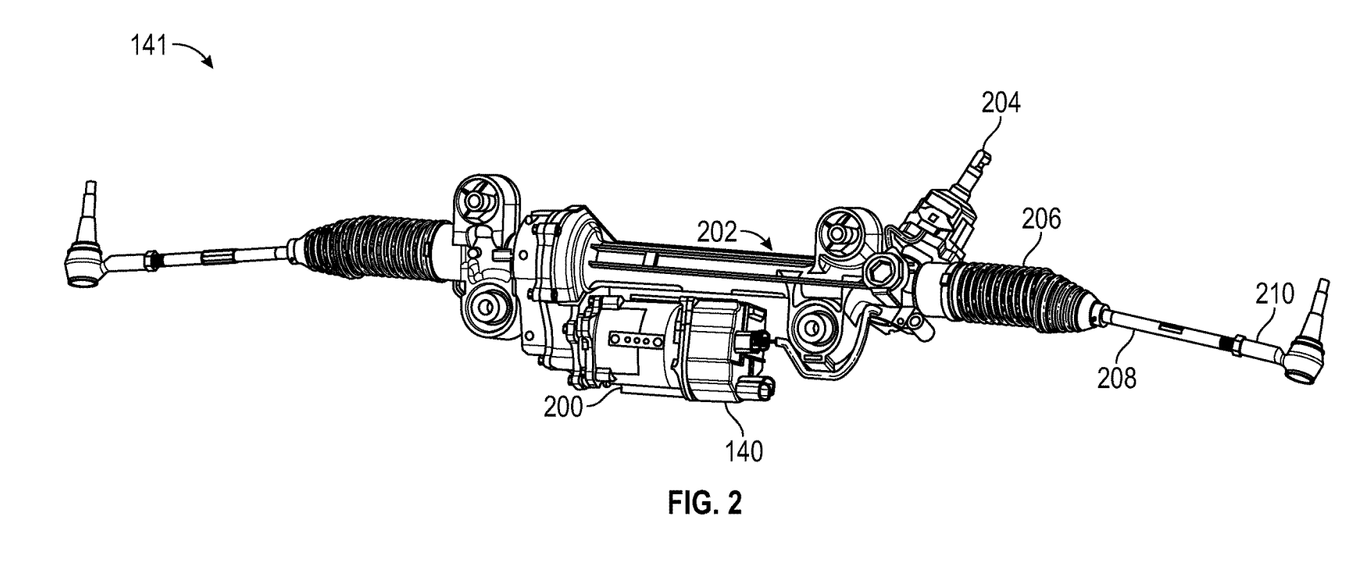
FIG. 2 is an illustration of the Rack Electric Power Steering gear (REPS) of FIG. 1, in accordance with various exemplary embodiments.
Figure 3:
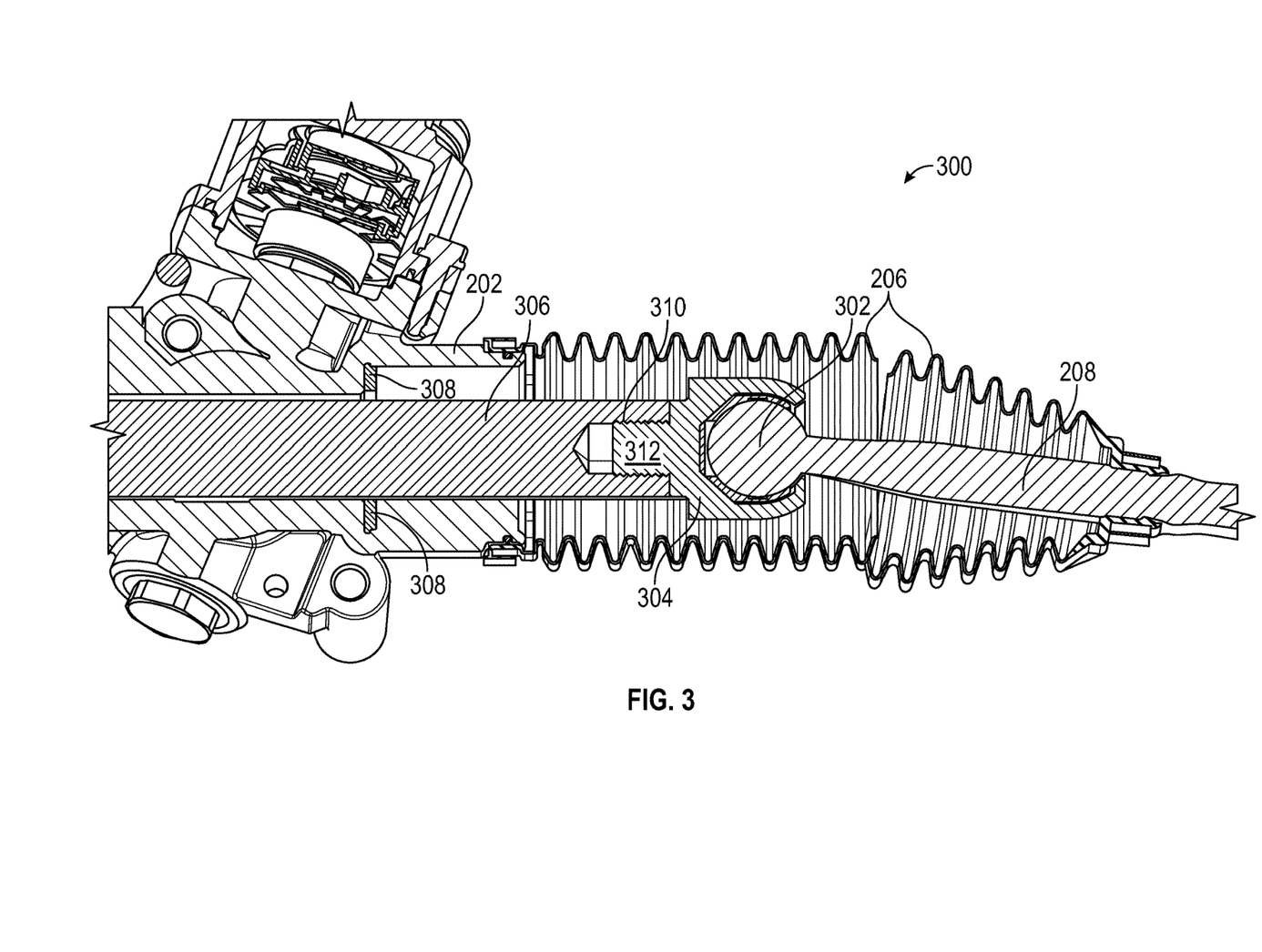
FIG. 3 is an enlargement of a portion of the REPS of FIG. 2, in accordance with various exemplary embodiments.
Figure 6:
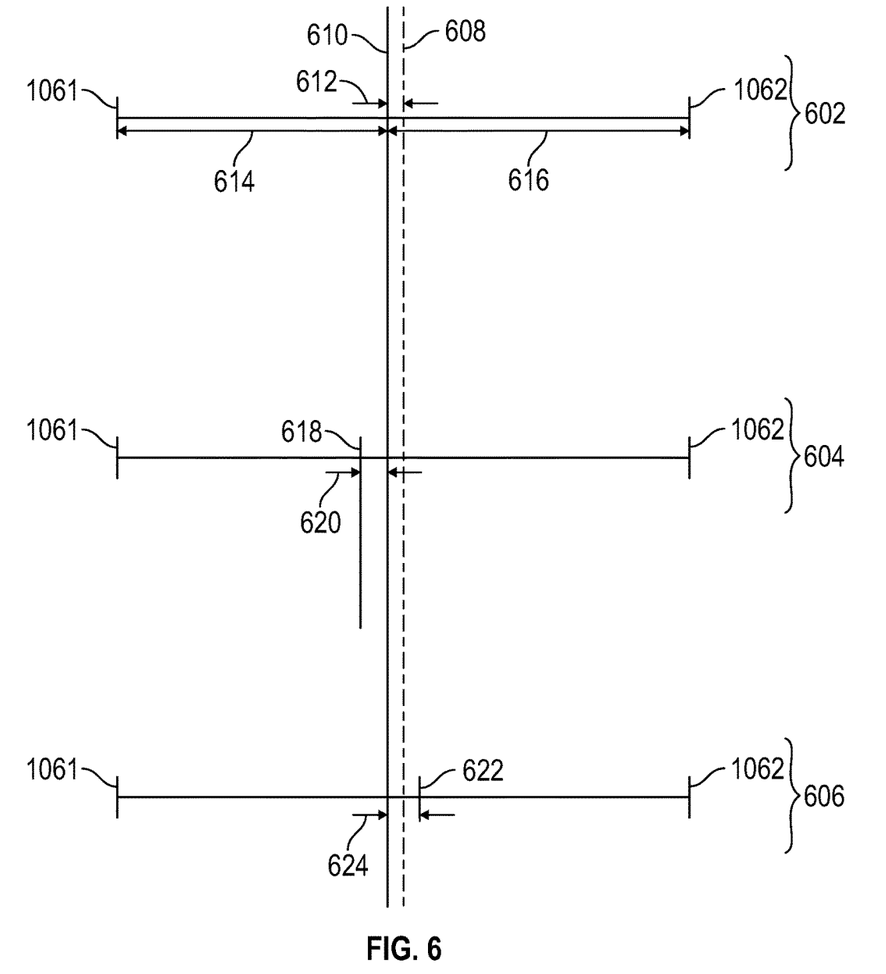
FIG. 6 is an illustration depicting learned mechanical center and true rack center offset, in accordance with various exemplary embodiments.

To effect a turn, lateral forces are applied to the wheels 1061 and 1062. From the perspective of the user, the steering wheel 160 is manipulated, providing mechanical movement (torque) that is transmitted down the steering rod 162, into the REPS 141. The ECU 140 cooperates with the REPS 141 in the detection and conversion of mechanical movements into electronic commands, and converting the torque into the lateral forces (also referred to as turning forces) that result in turning of the wheels 1061 and 1062. FIG. 2 and FIG. 3 provide more detail of the components of the REPS 141 that operate to turn the wheels 1061 and 1062, and the description in connection with FIG. 6 provides more information about steering data.

In addition to the above described functional blocks, the following functional blocks may be enclosed within the body 102 of the vehicle 100, and may communicate with the ECU 140: a powertrain controller module (PCM) 108, a user input device 112, a display system 114, an external port 118, the sensor system 134, and a transceiver 136. Each of the depicted functional blocks within the vehicle 100 are in operable communication with each other via an internal controller area network bus, CAN bus 164. The CAN bus 164 can be any suitable physical or logical means of connecting the vehicle systems and components. This includes, but is not limited to, direct hard-wired connections, fiber optics, infrared and wireless bus technologies, and may include a variety of communication protocols. The systems and components that are connected to the CAN bus 164 may be referred to as being "on" the CAN bus 164. As may be readily appreciated, each system or component that is on the CAN bus 164 comprises suitable signal processing and converting capability to support a communication protocol associated with the CAN bus 164.

The PCM 108 is an electronic control unit on the CAN bus that controls the function of the powertrain. The powertrain 110 is a propulsion system mounted on the chassis 104, and comprises a drive train for driving the wheels 106. In certain exemplary embodiments, the powertrain 110 comprises an internal combustion engine and/or an electric motor/generator (referred to herein as simply an "engine"), coupled with a drive train and a transmission thereof. In certain embodiments, the powertrain 110 may vary, and/or two or more powertrains 110 may be used. The combination of the PCM 108 and the powertrain 110 may provide all-wheel-drive (AWD), rear-wheel-drive (RWD), or front-wheel-drive (FWD). By way of example, the engine in the powertrain 110 may include any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor, and may further be associated with a manual or automatic transmission. In various applications, the PCM 108 may base engine control, at least in part, on commands and/or flags generated by the ECU 140.

The user input device 112 may represent any one, or combination, of various other known user input device devices including, but not limited to, a touch sensitive screen, a cursor control device (CCD) (not shown), such as a mouse, a trackball, or joystick, and/or a keyboard, one or more buttons, switches, or knobs. In various embodiments, the user may utilize the user input device 112 to initiate program uploads or respond to flags and/or alerts generated by the present systems and methods.

The display system 114 may be implemented using any one of numerous known display devices suitable for rendering textual, graphic, and/or iconic information in a format viewable by a user. As such, the display system 114 and the user input device 112 may be part of or integrated with the infotainment or navigation system (not shown), and may be employed to load programs and/or parameters into a memory, or memory device, as described below. Non-limiting examples of such display devices include cathode ray tube (CRT) displays, and flat panel displays such as LCD (liquid crystal displays) and TFT (thin film transistor) displays.

Each sensor of the sensor system 134 may be specifically coupled to a component or subsystem of the vehicle 100 and configured to sense a specific aspect of the component or subsystem. In various embodiments, aspects of components and subsystems that are sensed include: electrical, pressure, and/or mechanical connection of the components and subsystems, temperature, vibration, displacement, and velocity. In addition to rack travel data from the REPS 141, the ECU 140 may receive and process sensor data from the sensor system 134. As a non-limiting example, the sensor data may include velocity in the x direction (of a Cartesian coordinate system), acceleration information, yaw rate, torques from the steering wheel 160, a measured steering angle $\delta_{sw}$ with respect to the steering wheel 160, wheel velocities, braking forces, inclines and declines during travel, pressure on a gas pedal and a brake, gear status, and battery status information.

The transceiver 136 may include at least one receiver and at least one transmitter that are operatively coupled to the CAN bus 164. The transceiver 136 establishes and maintains the communications links to onboard systems and components and external communication sources, including wireless communication. The transceiver 136 can perform signal processing (e.g., digitizing, data encoding, modulation, etc.) as is known in the art. The external port 118 is a physical connector for attaching an external test or diagnostic system to the CAN bus 164 of the vehicle 100, to communicate with systems and components on the CAN bus 164.

Having described the main functional blocks of the vehicle 100, the components of the ECU 140 and their functions are described. In the depicted embodiment, the ECU 140 includes a processor 142 communicatively coupled to an interface 146. General instructions and applications associated with ECU 140 operation are stored in memory in the ECU 140; and, specifically, the program 156 and stored parameters 154 associated with the ECU 140 operations described herein are stored in the memory therein. Parameters, such as a learned mechanical center, and various generated thresholds, may be stored in stored parameters 154. During initialization, various program products, such as the program 156 and the stored parameters 154, may be pre-loaded and stored in the ECU 140, uploaded into the ECU 140 through the transceiver 136, uploaded into the ECU 140 via the external port 118, or uploaded into the ECU 140 via a user input device 112. As described in more detail below, during operation, the ECU 140 executes the program 156 and references the stored parameters 154 to perform actions and functions described herein, in accordance with steps of a method (reference FIG. 7 for the method). It will be appreciated that the ECU 140 may perform other functions beyond the scope of the present disclosure.

In various embodiments, it is the processor 142 that loads and executes the program 156 to perform the computation and control functions attributed to the ECU 140. The processor 142 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. In other embodiments, the processor 142 may be implemented in any combination of software or firmware, and program 156 may comprise program code segments distributed throughout that software or firmware.

The memory, or memory device, can be any type of suitable computer readable storage medium, for example, any of the various types of dynamic random access memory (DRAM) such as SDRAM, any of the various types of static RAM (SRAM), and any of the various types of non-volatile memory (PROM, EPROM, and flash). Memory locations where data bits are maintained are physical locations that have particular electrical, magnetic, optical, or organic properties corresponding to the data bits. In certain examples, the memory is located on and/or co-located on the same computer chip as the processor 142. The memory may also comprise a database, and may be utilized as both storage and a scratch pad for ECU 140 computations.

The interface 146 enables communication within the ECU 140 and enables communication between ECU 140 and systems external to the ECU 140. The interface 146 can be implemented using any suitable method and apparatus. The interface 146 can include one or more network interfaces to communicate on the CAN bus 164, and to communicate with external systems or components, technicians, and/or storage apparatuses. In various embodiments, the interface 146 obtains the various data from the REPS 141, the sensors of the sensor system 134 and/or the transceiver 136.

Turning now to FIG. 2, and with continued reference to FIG. 1, the REPS 141 is described. The steering rod 162 attaches to a steering gear pinion 204. A steering gear housing 202 couples features from the left and right side of the REPS 141. Since the features are repeated on each side, only the features on the right side are labeled in FIG. 2. An inner tie rod 208 and an outer tie rod 210 are shown, the outer tie rod 210 being configured to couple a wheel to a first side of the REPS 141. In FIG. 2, the REPS 141 comprises the ECU 140. In various embodiments, a steering gear electric motor 200 may be coupled to the ECU 140 and to one or more features of the REPS 141.

In FIG. 3, cross sectional image 300 depicts the inner tie rod 208 having an inner tie rod ball joint 302 that secures within an inner tie rod ball joint housing 304. The inner tie rod ball joint housing 304 includes a fastener 312 that has thread that matches the thread of threaded interface 310. The threaded interface 310 provides a mechanism for the fastener 312 to be secured within the steering gear rack bar 306, thereby coupling the inner tie rod ball joint housing 304 to the steering gear rack bar 306. During steering maneuvers, the steering gear rack bar 306 may move around within the steering gear housing 202. A circular bumper 308, often made of a flexible material, radially surrounds the steering gear rack bar 306 near the steering gear housing 202. The circular bumper 308 provides a cushion to the inner tie rod ball joint housing 304 as the steering gear rack bar 306 travels within the steering gear housing 202 in the course of turning and is also used to limit the rack travel when the inner tie rod ball joint housing 304 travels full left or right, by providing a physical stop for the lateral movement of the inner tie rod ball joint housing 304.

Figure 4:
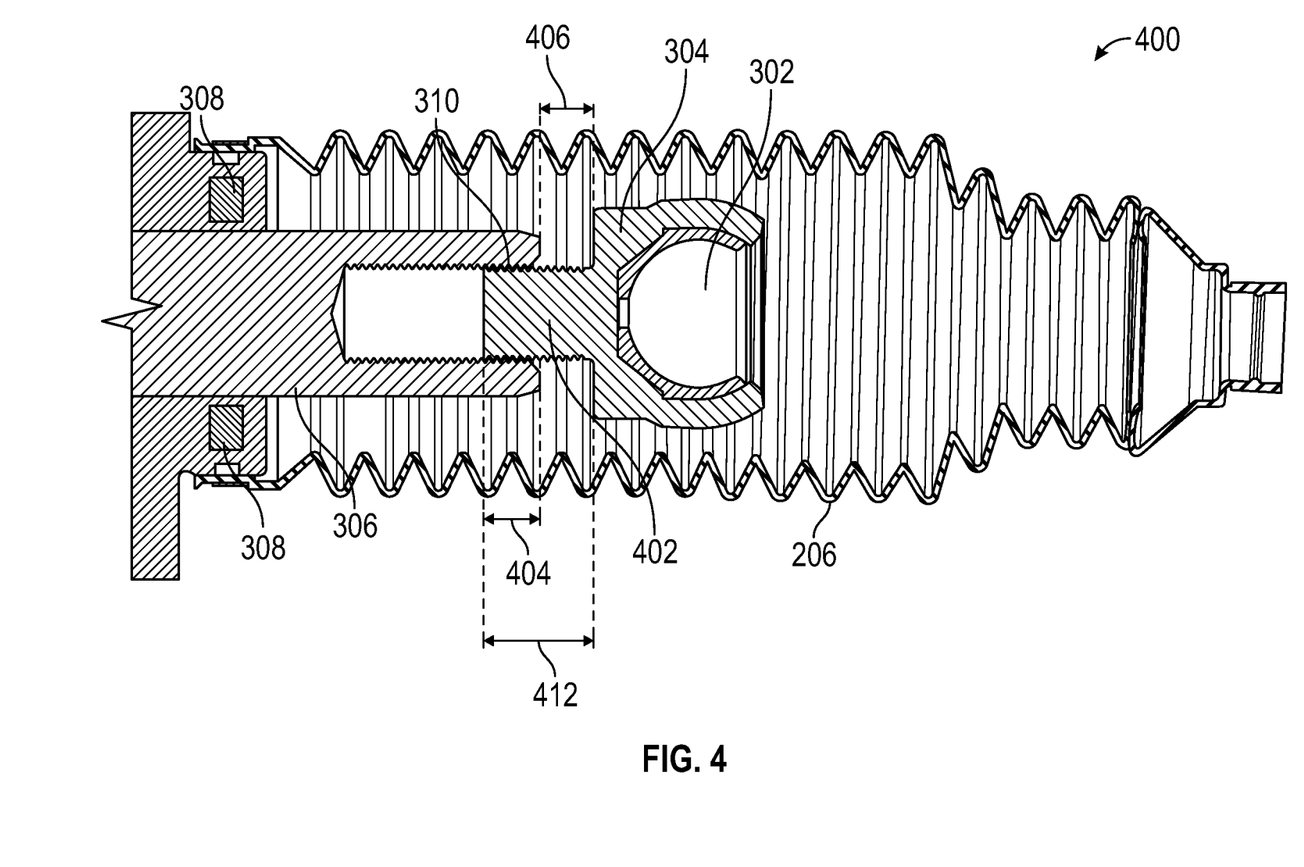
FIG. 4 is a cross section of an inner tie rod boot of the REPS, showing internal components.

In the course of vehicle 100 operation and turning, the fastener 312 may loosen and disengage slightly from its secured position in the steering gear rack bar 306, wherein disengagement is defined as movement that results in a reduced thread engagement along the threaded interface 310. If the fastener 312 disengages slightly and the disengagement is not detected or addressed, it may continue to loosen and disengage during operation of the vehicle 100, resulting in a length of engagement along threaded interface 310 that may be too small for safety objectives. Turning now to FIG. 4, a depiction of a fastener 412 that has disengaged somewhat from the steering gear rack bar 306 is shown. The first length of engagement 404 along the threaded interface 310 is less than first length 402. Steering gear overtravel reflects the amount of disengagement of the fastener 412 from a respective steering gear rack bar 306, the measure of which rack travel data is based on. Rack travel data is described in more detail in connection with FIG. 6. Due to the relatively short first length 402 of the fastener 412, there is a small margin for permissible displacement and a correspondingly small margin for detection of the first amount of disengagement 406. The small margin for detection of disengagement restricts opportunities for maintenance interventions. These are technological problems addressed by the embodiments presented herein.

Figure 5:
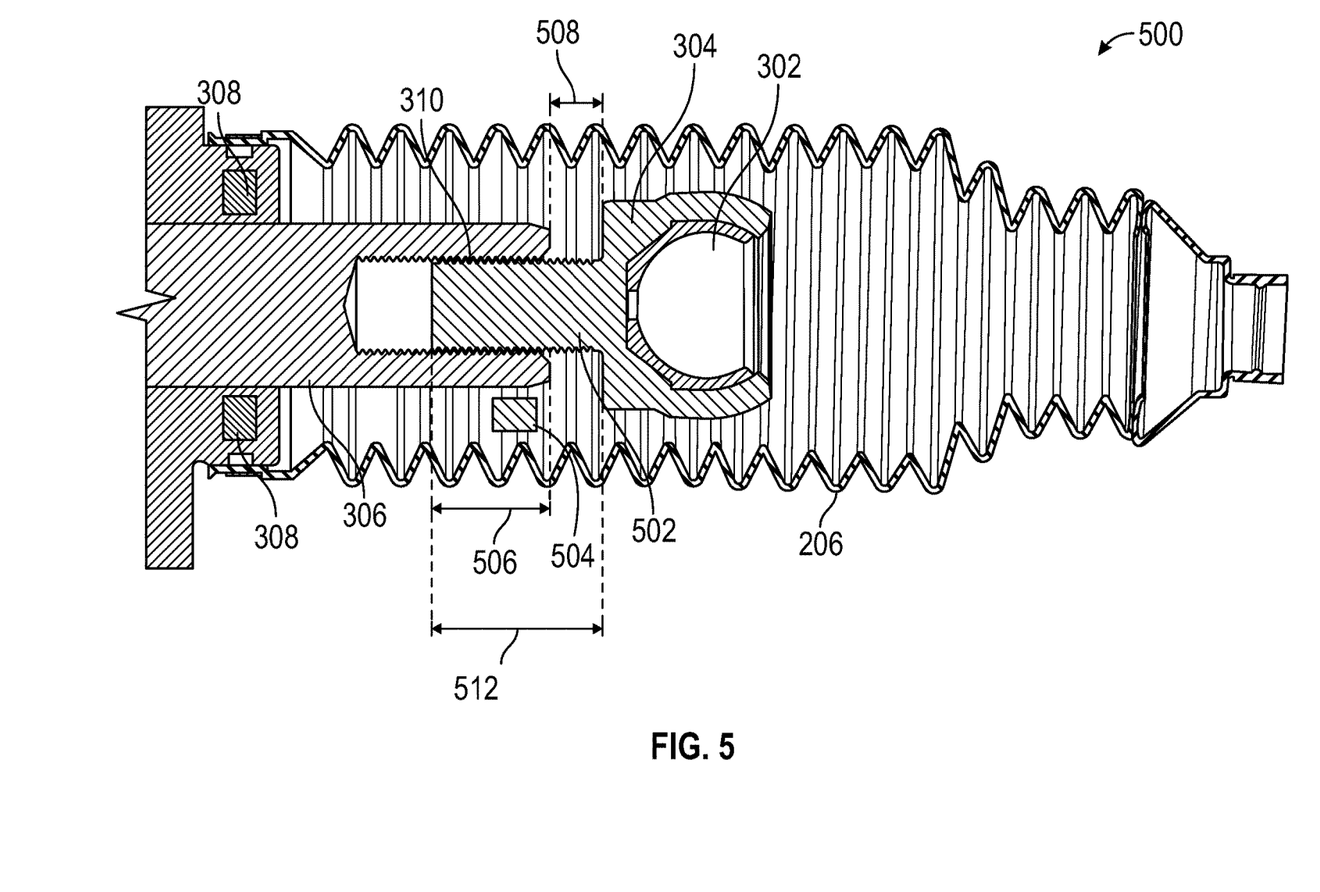
FIG. 5 is a cross section of an inner tie rod boot, showing internal components, in accordance with various exemplary embodiments.

Generally, the threaded interface 310 and a length of the fastener 312 may be related. In many designs, manufacturing pressures keep the length of the fastener 412 as short as possible. Often, an approximately one to one ratio of thread diameter size to fastener length is considered to provide a sufficient thread engagement along the threaded interface 310 (wherein approximately is defined as plus or minus two percent). For example, a 15 millimeter (mm) thread diameter may have a 15 mm fastener 312 length. The present disclosure introduces the concept of increasing the fastener length to achieve approximately a ratio of three to five, for example, a 15 mm thread diameter with a 25 mm length. As may be readily appreciated, the additional length enables more disengagement without any safety concerns (such as a potential for complete disengagement), and also provides additional margin for detection of disengagement by one or more ECU sensors. FIG. 5 provides more detail about the implementation of this technological solution.

FIG. 5 illustrates this concept. A fastener 512 is depicted with a second length 502, which is longer than first length 402, in accordance with various embodiments. Fastener 512 is shown disengaged somewhat from the steering gear rack bar 306, and the second length of engagement 506 along the threaded interface 310 is larger than the first length of engagement 404. The second length of engagement 506 is still sufficiently long enough to secure the fastener 512 within the steering gear rack bar 306. The additional length in second length 502 of the fastener 512 also provides an additional amount of potential disengagement (the second amount of disengagement 508) while still remaining securely fastened. The increased magnitude of the second amount of disengagement 508 also increases a margin for sensing of the movement by ECU sensors 504. Although only one ECU sensor 504 is depicted, it is readily appreciated that a plurality may be used, in order to achieve the sensing as described hereinbelow.

The rack travel is determined at least in part by sensing, by one or more ECU sensors 504, movement in the form of an amount of electric motor rotation to the left or to the right. One or more ECU sensors 504 are also configured to detect, or sense, location of a first fastener 512 (on a first side of the REPS 141) with respect to the threaded interface 310 over time; the detected amount of disengagement of the first fastener 512 may be converted by the ECU 140 into rack travel data. Likewise, on a second, opposing side of the REPS 141, one or more ECU sensors 504 are configured to detect, or sense, location of a second fastener 512 with respect to a second threaded interface 310 over time; the detected amount of disengagement of the second fastener may also be converted by the ECU 140 into rack travel data; therefore, rack travel data may represent rack travel left and rack travel right, as described in connection with FIG. 6.

Increasing the length of the fastener from first length 402 to second length 502, and detecting an amount of fastener disengagement 508 with the one or more ECU sensors 504, are some of the features that enable the ECU 140 to generate various flags, as is described in connection with FIG. 7.

The "rack" has been mentioned briefly above. For the purpose of description herein, "rack" shall refer to the outer tie rod 210 for the left front wheel 1061, the outer tie rod 210 for the right front wheel 1062, and all of the mechanical components of the REPS 141 that connect the two. Generally, "rack travel" encompasses various a priori measured rack alignment data, as well as operationally detected "rack travel data" comprising rack travel to the left data and rack travel to the right data; the specifics of these are described in more detail as follows.

FIG. 6 provides three simplified illustrations of a rack (602, 604, and 606) for a description of the a priori measured rack alignment data. Centerline 608 evenly bisects rack 602, rack 604, and rack 606. At the steering supplier, a full left learned rack travel (LLRT) 614 and a full right learned rack travel (RLRT) 616 are measured and stored in stored parameters 154. LLRT 614 and RLRT 616 provide a learned mechanical center 610. Separately, in assembly of the vehicle 100, the vehicle 100 receives a front end alignment, and a true rack center offset TRCO 612 is measured. The TRCO 612 is measured with respect to the learned mechanical center 610. In rack 604, the TRCO is 620, measured between 618 and 610, and in rack 606, the TRCO is 624, measured between 610 and 622. After measurement, the TRCO is received by the ECU 140 and stored as a stored value in stored parameters 154.

As one may readily appreciate, a certain amount of rack travel is permissible during the course of vehicle 100 operation, and beyond a certain point, the rack travel may warrant concern. Rack travel thresholds are generated to serve as the boundary of permissible rack travel, and when thresholds are exceeded (overtravel), various flags may be generated. The RLRT 616, LLRT 614, and TRCO (620 or 624) are used by the ECU 140 in the generation of rack travel thresholds, described in more detail in connection with FIG. 7.

Figure 7:
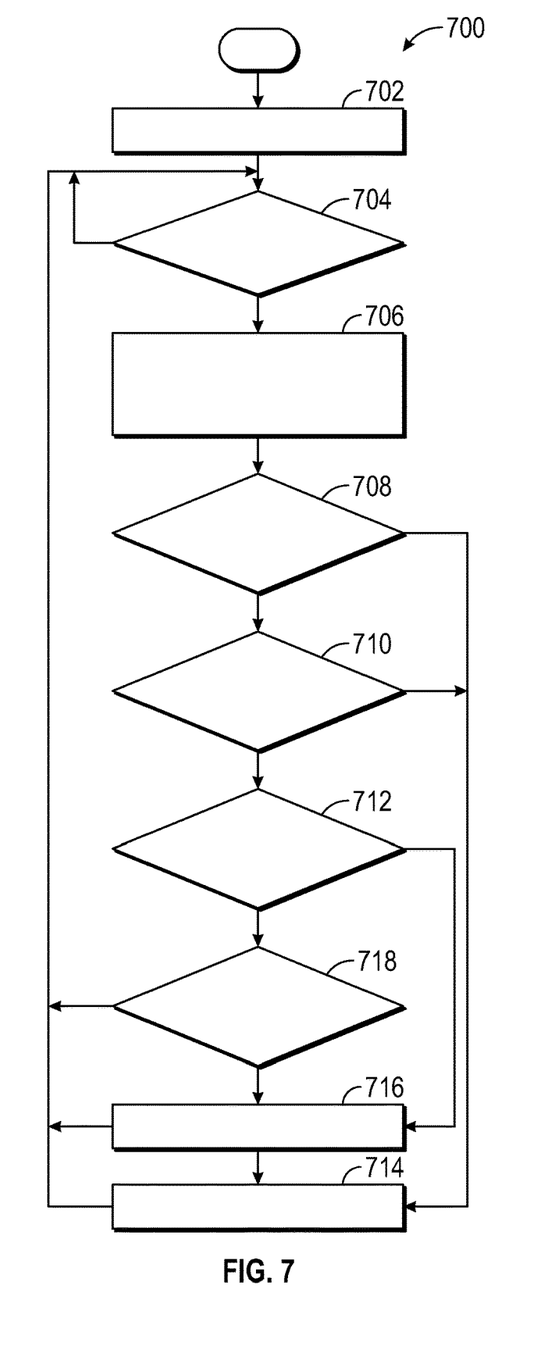
FIG. 7 is a flow chart describing a method for an ECU, in accordance with various exemplary embodiments.

Referring now to FIG. 7 and with continued reference to FIG. 1, a flow chart is provided for a method 700 for an ECU 140, in accordance with various exemplary embodiments. Method 700 represents various embodiments of a method to monitor rack and pinion steering gear overtravel, associated with the ECU 140. For illustrative purposes, the following description of method 700 may refer to elements mentioned above in connection with FIG. 1. In practice, portions of method 700 may be performed by different components of the described system. It should be appreciated that method 700 may include any number of additional or alternative tasks, the tasks shown in FIG. 7 need not be performed in the illustrated order, and method 700 may be incorporated into a more comprehensive procedure or method having additional functionality not described in detail herein. Moreover, one or more of the tasks shown in FIG. 7 could be omitted from an embodiment of the method 700 as long as the intended overall functionality remains intact.

The method starts, and initialization is performed at 702. Initialization may comprise receiving and storing program 156 and stored parameters 154. Receiving and storing is understood to include uploading or updating instructions and applications, such as program 156, stored parameters 154, and any additional lookup tables or rules stored in memory in the ECU 140. Stored parameters 154 include LLRT 614, RLRT 616, and TRCO (620 or 624), as described above. Stored parameters may also include a predefined first value (PD1) and a predefined second value (PD2), which are referenced to generate rack travel thresholds. PD1 and PD2 are configurable, and may be configured prior to initialization.

The processor 142 processes PD1, PD2, RLRT, and TRCO, to generate a first rack travel right (RTR) threshold and a second RTR threshold; The processor 142 also processes PD1, PD2, LLRT, and TRCO to generate a first rack travel Left (RTL) threshold and a second RTL threshold. The generated thresholds are also stored in stored parameters 154. In an embodiment: a first RTL threshold is defined as LLRT 614+TCRO+PD1; a first RTR threshold is defined as RLRT 616−TRCO+PD1; a second RTL threshold is defined as LLRT 614+TCRO+PD2; a second RTR threshold is defined as RLRT 616−TRCO+PD2. In an embodiment, PD1 is approximately 6 mm, and PD2 is approximately 4 mm, wherein approximately is plus or minus 2%.

At 704, the method 700 cycles until receiving an indication that the vehicle is operating. The indication may be a signal or command provided by the sensor system 134, and may be retrieved from the CAN bus 164. At 706, the ECU 140 continuously and concurrently senses, via respective ECU sensors 504, the rack travel left (RTL) and the rack travel right (RTR). RTL and RTR are collectively referred to as rack travel data, and the ECU 140 may place rack travel data on the CAN bus 164. At 708, RTL is compared to the first RTL threshold, and if RTL is greater than the first RTL threshold, a first flag is asserted at 714. If RTL is not greater than the first RTL threshold, the RTR is compared to the first RTR threshold at 710. If the RTR is greater than the first RTR threshold, the first flag is asserted at 714. In various embodiments, the first flag is an urgent or critical flag.

At 710, if the RTR is not greater than the first RTR threshold, the RTL is compared to the second RTL threshold at 712. If RTL is greater than the second RTL threshold at 712, a second flag is asserted at 716. If RTL is not greater than the second RTL threshold at 712, RTR is compared to the second RTR threshold at 718. If RTR is greater than the second RTR threshold at 718, the second flag is asserted at 716. In various embodiments, the second flag is a caution flag, which is less urgent or critical than the first flag. If RTR is not greater than the second RTR threshold at 718, the method cycles back to sensing vehicle operation at 704.

While FIG. 7 depicts 708, 710, 712, and 718 as being sequential, and in the order depicted, it is readily appreciated that 708 and 710 may be interchanged, and that 712 and 718 may be interchanged. Moreover, 712 may be construed as RTL less than the first RTL threshold but greater than the second RTL threshold. Likewise, 718 may be construed as RTR greater than the second threshold but less than the first threshold. Construing 712 and 718 as described allows them to be interchanged in order with 708 and 710.

Accordingly, the provided systems and methods are capable of monitoring steering gear overtravel, and provide, responsive to the monitoring, (i) a caution flag, for use on the Controller Area Network (CAN) bus of the vehicle, and (ii) an urgent flag, for use on the CAN bus. As described above, in various embodiments, the first flag may be considered an urgent flag, and the second flag may be considered a caution flag, which is less urgent or critical than the first flag. The caution flag and urgent flag may be generated responsive to comparing measured fastener disengagement (or overtravel) to one or more configurable predetermined thresholds. The provided system and method may take the form of ECU 140 integrated within a preexisting mobile platform or vehicle management control system It will also be appreciated that while the depicted exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 156 and containing computer instructions stored therein for causing a computer processor (such as the processor 142) to perform and execute the program 156. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope as set forth in the appended claims.

What is claimed is:

1. An electronic control unit (ECU) for a steering system in a vehicle, the ECU comprising:
    a memory comprising a program; and
    a processor coupled to the memory and configured to:
        receive and store in the memory a first predefined value (PD1) and a second predefined value (PD2);
        receive and store in the memory a right learned rack travel (RLRT), and a true rack center offset (TRCO);
        receive and store in the memory a left learned rack travel (LLRT);
        process PD1, PD2, RLRT, and TRCO to generate a first rack travel right (RTR) threshold, a second RTR threshold, a first rack travel left (RTL) threshold and a second RTL threshold;
        receive rack travel data associated with an ECU sensor, the rack travel data comprising a rack travel right (RTR) and a rack travel left (RTL); and
        assert a first flag responsive to determining (i) that the RTR is greater than the first RTR threshold, or (ii) that the RTL is greater than the first RTL threshold.

2. The ECU of claim 1, wherein the processor is further configured to:
    assert a second flag responsive to determining (iii) that RTR is less than or equal to the first RTR threshold and greater than the second RTR threshold, or (iv) that RTL is less than or equal to the first RTL threshold and greater than the second RTL threshold.

3. The ECU of claim 2, wherein the rack travel data reflects an amount of disengagement of a fastener in a Rack Electric Power Steering system (REPS).

4. The ECU of claim 3, wherein the fastener has a thread size to fastener length ratio of approximately 3:5.

5. The ECU of claim 4, wherein the ECU sensor is configured to detect the amount of disengagement of the fastener.

6. The ECU of claim 5, wherein the fastener comprises a first fastener associated with a first turning wheel of the vehicle, and further comprising a second fastener associated with a second turning wheel of the vehicle, the first turning wheel and second turning wheel being on opposing ends of the REPS, and wherein the rack travel data comprises information about (i) an amount of disengagement of the first fastener and (ii) an amount of disengagement of the second fastener.

7. An electronic power steering system (EPS) for a vehicle, the EPS comprising:
    a memory comprising a program; and
    a processor coupled to the memory and configured to:
        receive and store in the memory a first predefined value (PD1) and a second predefined value (PD2);
        receive and store in the memory a right learned rack travel (RLRT), and a true rack center offset (TRCO);
        processing the PD1, the PD2, the RLRT, and the TRCO to generate a first rack travel right (RTR) threshold and a second RTR threshold;
        receive rack travel data associated with an ECU sensor, the rack travel data comprising a rack travel right (RTR); and
        assert a first flag upon determining that the RTR is greater than the first RTR threshold, or assert a second flag upon determining that the RTR is less than or equal to the first RTR threshold, and greater than the second RTR threshold.

8. The EPS of claim 7, wherein the rack travel data further comprises a rack travel left (RTL), and wherein the processor is further configured to:
    receive and store in the memory a left learned rack travel (LLRT);
    process the PD1, the PD2, the LLRT, and the TRCO to generate a first rack travel left (RTL) threshold and a second RTL threshold; and
    assert the first flag upon determining that the RTL is greater than the first RTL threshold, or assert a second flag upon determining the RTL is less than or equal to the first RTL threshold, and greater than the second RTL threshold.

9. The EPS of claim 8, wherein the rack travel data reflects an amount of disengagement of a fastener in a Rack Electric Power Steering system (REPS).

10. The EPS of claim 9, wherein the ECU sensor is configured to detect the amount of disengagement of the fastener.

11. The EPS of claim 10, wherein the fastener has a thread size to fastener length ratio of approximately 3:5.

12. The EPS of claim 11, wherein the fastener comprises a first fastener associated with a first turning wheel of the vehicle, and further comprising a second fastener associated with a second turning wheel of the vehicle, the first turning wheel and second turning wheel being on opposing ends of the REPS, and wherein the rack travel data comprises information about (i) an amount of disengagement of the first fastener and (ii) an amount of disengagement of the second fastener.

13. A method for operation of an electronic control unit (ECU) in a vehicle, the method comprising:
    receiving and storing in a memory a first predefined value (PD1) and a second predefined value (PD2);
    receiving and storing in the memory a right learned rack travel (RLRT), and a true rack center offset (TRCO);

generating a first rack travel right (RTR) threshold and a second RTR threshold based on the PD1, the PD2, the RLRT, and the TRCO;

utilizing a fastener having a thread size to fastener length ratio of approximately 3:5 to couple an inner tie rod ball joint housing to a steering gear rack bar;

generating rack travel data comprising a rack travel right (RTR) based on data from an ECU sensor; and asserting a first flag upon determining that the RTR is greater than the first RTR threshold, or asserting a second flag upon determining that the RTR is less than or equal to the first RTR threshold and greater than the second RTR threshold.

14. The method of claim 13, wherein the rack travel data further comprises a rack travel left (RTL), and further comprising:

receiving and storing in the memory a left learned rack travel (LLRT);

generating a first rack travel left (RTL) threshold and a second RTL threshold based on the PD1, the PD2, the LLRT, and the TRCO; and asserting the first flag upon determining that the RTL is greater than the first RTL threshold, or asserting a second flag upon determining the RTL is less than or equal to the first RTL threshold, and greater than the second RTL threshold.

15. The method of claim 14, further comprising detecting, with the ECU sensor, the amount of disengagement of the fastener.

16. The method of claim 15, further comprising providing the first flag and the second flag on a Computer Area Network (CAN) bus in the vehicle.

17. The method of claim 16, further comprising detecting that the vehicle is operating.

18. The method of claim 17, wherein the fastener comprises a first fastener associated with a first turning wheel of the vehicle, and further comprising utilizing a second fastener associated with a second turning wheel of the vehicle, the second fastener having a thread size to fastener length ratio of approximately 3:5, the first turning wheel and second turning wheel being on opposing ends of the REPS.

19. The method of claim 18, further comprising continuously and concurrently detecting, by the ECU sensor, information about (i) an amount of disengagement of the first fastener and (ii) an amount of disengagement of the second fastener.

20. The method of claim 19, wherein the first flag comprises an urgent flag for the vehicle, and the second flag comprises a caution flag for the vehicle.

* * * * *